Nov. 23, 1965    C. A. SIVER    3,219,311
VALVE ASSEMBLY HAVING PARTICULAR HEAD AND SEAT COOPERATION
Filed Dec. 12, 1962    5 Sheets-Sheet 1

INVENTOR.
CHESTER A. SIVER
BY Kenwood Ross
ATTORNEY.

INVENTOR.
CHESTER A. SIVER
BY Kenwood Ross
ATTORNEY.

United States Patent Office 3,219,311
Patented Nov. 23, 1965

3,219,311
VALVE ASSEMBLY HAVING PARTICULAR
HEAD AND SEAT COOPERATION
Chester A. Siver, 11 E. Primrose Drive,
Longmeadow, Mass.
Filed Dec. 12, 1962, Ser. No. 244,092
10 Claims. (Cl. 251—86)

The present invention relates generally to new and useful improvements and structural refinements in valve constructions and is directed more particularly to the provision of valve means especially suited for controlling the flow of fluids in high temperature and/or high pressure service.

The invention comprehends improvements in yoke constructions, cooperant with improvements in sealing closures allowing the maintenance of effective seals between the separable valve components to insure against pressure and fluid loss, in gland means allowing new and novel techniques in valve stem packing and the pressurizing thereof, in hard alloy valve members providing a plurality of wear resistant surfaces serving a plurality of interrelated functions, and in means for welding said valve members in secure pressure-tight relationship to their associated parts.

As a further refinement, I provide a plurality of closure and seal means for effectuating fluidtight seals in pressure casing openings for withstanding the encountered high pressures and/or temperatures and offering superior degrees of operating effectiveness.

As another salient feature, I provide constructions comprehending employment of a welding technique which permits the employment of accurately preshaped, intricately configured valve and back seat members and the weldment thereof conceivably in situ within the casing.

The invention particularly comprehends that a plurality of ratings of valves may be machined from identical valve body forgings, as for instance a 1500-pound, 2500-pound and 4500-pound and/or other desired ratings, merely the diameters of the fluid conduits therethrough being varied to provide the necessary body wall thickness, according to pressure class. Stated otherwise, merely by changing the inside diameter of a particular valve body, it obviously is possible to accommodate a plurality of valve requirements with a series of valves machined from identical forgings, and with a minimum number of different cooperant components being necessitated therefor.

In keeping with standard pipe practice, where outside diameters are standardized and inside diameters are varied according to pressure class, I envision herein employment of a plurality of rated valves for accommodating connecting fluid lines or pipes of standardized outside and inside diameters, with a particular size of valve body being employed for a specific installation and with its inside diameter being appropriately related to the inside diameter of the connecting fluid lines or pipes.

Too, I provide valve constructions in which ruggedness and durability of construction are combined with simplicity and ease of use and protection against the normally hard conditions of practical use resulting in an apparatus which effectively meets the normal requirements therefor and performs its functions in a practical and dependable manner.

Further, while the components are uniquely compact, they are nevertheless readily accessible for maintenance and replacement purposes with a consequent reduction in maintenance costs over related devices heretofore known.

Other of the chief objects and purposes hereof are to provide advantageous structural and operational features in devices of the class to which reference has been made so as to offer various valve apparatus, each having the following inherent meritorious characteristics: first, engineeringwise, a uniqueness in design of coacting parts wherefore the components are coordinated for facile assembly, and when once assembled, are positively and securely retained in operative relationship so as to be not readily separable from each other, accidentally or otherwise; second, a susceptibility to easy installation; third, a high degree of safety in its use; fourth, a high degree of efficiency and dependability in its operational use; fifth, the securement of a higher degree of accuracy and greater degree of variety in the manner of work performed therewith than has heretofore been possible with prior devices known in the art; sixth, the attainment of a convenience of arrangement of parts and a flexibility or a capability of adjustment by which a large variety of work can be produced by means of the same device; seventh, the provision of unique welding techniques allowing the securing together of preformed operating components; eighth, the provision of a construction which is well adapted to withstand the usage to which valves are ordinarily subjected, and ninth, the provision of such other improvements in and relating to valves of the type above referred to as are hereinafter described and claimed.

These foregoing objects and other incidental ends and advantages characterize the devices of the present invention, and distinguish them from previously known devices of a kindred nature.

Further objects are to provide valve constructions conformable to the desiderata of the preceding paragraphs and offering specific improvements in their various operating instrumentalities.

All of these objects are susceptible of attainment by use of constructions different in certain respects from those disclosed, such as in variations of dimensions, configurations, types of subassemblies and accessories, proportions, integration and/or cooperation of material, all without departing from the underlying principles, salient features, spirit, and scope hereof, and it would be well to state here that by utilizing the invention only in certain of its aspects, certain of these objects may be attained individually or in sub-groups in useful embodiments which involve less than the entirety of the invention.

To the end of attaining these objects and advantages and others hereinafter reasonably appearing, it will be explained that the invention consists substantially in the particular constructions, configurations, dispositions, relationships, combinations and functions of the organization of coacting elements, components and instrumentalities of valve constructions as exemplified in the following detailed disclosure wherein the aforestated objects will be in part obvious and apparent and will be in part more fully pointed out.

It will be apparent, however, that the specific physical embodiments delineated, albeit the preferred exemplifications, are only exemplary and explanatory of but several of the multiplicity of ways in and purposes for which the principles of the invention may be employed. The invention reverted to is not restricted or confined to said embodiments and is not intended to be exhaustive of, nor limiting of, the spirit or scope hereof. Rather these are submitted as best known structural embodiments for the purpose of illustrating the invention and explaining the details of construction and arrangement of parts, in accordance with the patent statutes, that others skilled in the art to which the invention pertains may so fully understand the invention, its principles and applications thereof, that they may embody same and adapt them in numerous forms, each as may be best suited to the conditions and requirements of any particular use.

The precise construction of the figures of the drawing need not be slavishly followed as, of course, the valves may have to be mechanically varied or alternatively constructed or modified in accordance with any specific use contemplated therefor. Such adaptations and/or alternative constructions and/or modifications are intended to be comprehended within the meaning and purview and range of equivalence of the below subjoined claims, there being no intent to have this invention limited to or circumscribed by any specific details.

To enable others skilled in the art so fully to comprehend the underlying features hereof that they may embody the same in the various ways contemplated by this invention, drawings depicting preferred typical constructions have been annexed as a part of this disclosure, and in such drawings, like characters of reference denote corresponding parts through all the views, of which.

In the following description and appended claims, various components and details thereof will be identified by specific names for purposes of convenience. Such are used in a generic and descriptive sense only, the phraseology or terminology employed being not for the purpose of limitation, the phrases and terms rather being intended to be as generic in their application as the art will permit.

All of the above referred to embodiments involve the same basic principle wherefore parts in the figures which are essentially identical will be identified by the same characters of reference for the sake of simplification and ease of reading.

Figures 1, 2, 3, 4, 5:
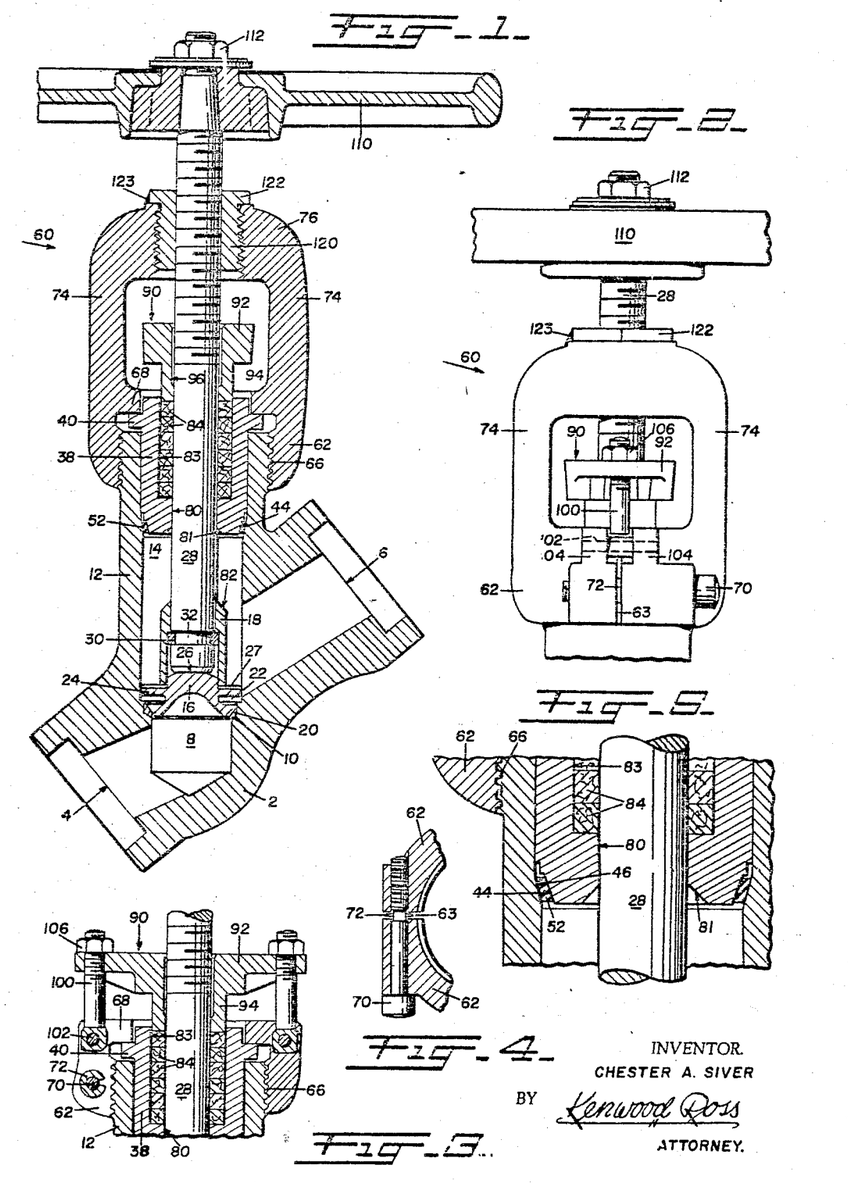
FIG. 1 illustrates, in vertical central sectional assembly view, a valve constructed in accordance with a preferred embodiment of the present invention.
FIG. 2 illustrates, fragmentarily, a side elevational view of the valve shown in FIG. 1, taken at right angles thereto, for purposes of better showing the clamp yoke.
FIG. 3 illustrates, fragmentarily, in vertical central sectional view, certain features of the clamp yoke shown in FIG. 2.
FIG. 4 illustrates, fragmentarily, an enlarged sectional view showing a clamp bolt and snap ring in cooperating association with the divided or split sections of the lower ring of the clamp yoke.
FIG. 5 illustrates, fragmentarily, in an enlarged vertical central sectional view, the float ring seal of the valve of FIG. 1 in cooperating relationship with adjacent components.

With continued reference now to the drawings, which illustrate typical embodiments of the invention for purposes of disclosure and form a part of this specification, and more particularly with reference to sheet 1 of the drawings, I have shown, in FIG. 1, an assembled valve of the globe valve type, although it will be understood that the principles of the invention are equally applicable to angle valves, check valves, gate valves, diaphragm-operated valves, especially of the pressure balanced and single seated types, as well as to valves of other appropriate designs.

Said valve is inclusive of a valve body or casing 2 having end ports 4 and 6 interconnected by a through flow passage 8 allowing fluid flow therethrough and an annular, horizontally disposed, hard alloy, inserted element or seat ring 10, having a flat or bevelled wear resistant seating surface and being disposed in said through flow passage. Alternatively, said seating arrangement may comprise an integrally formed body seat which may be hard surfaced by an inlay welding technique and machined in place.

Such welding technique comprehends use of a controlled beam of charged particles whereby to permit welding by the melting of the material at the weld seam in a narrow channel through the weld seam, only a small region of the material adjacent the weld being subjected to heat stress. It allows the further advantage that it permits welding at comparatively high speed due to the fact that only comparatively thin regions of the materials adjacent the channel of beam penetration must be heated and melted wherefore the heat conductivity of the material does not limit weld speed, said heating taking place simultaneously along the depth of penetration of the beam, as contrasted with prior art systems where the superficially generated heat must first penetrate, at relatively slower speed, into the material by heat conduction and cause the melting of a comparatively large volume of material.

In contrast with welding processes, as taught by prior systems, the thermally stressed area of material is considerably decreased.

Too, such system avoids the necessity for prepared shaped and welding seams.

If desired, said inserted element 10 may be welded to the valve body 2, as by electron beam welding, to form a valve seat by direct fusion of a precision cast, hard alloy, ring in fluidtight engagement with said body, in accurate alignment with and at the bottom of the flow chamber of the valve body, by a system which avoids distortion or deformation or cracking of the ring.

In the welding process here comprehended, a beam of charged particles is used as a means for supplying energy, said beam being focused, at or close to the weld and its intensity being so regulated that the beam, forming a narrow, highly heated channel at the place of impingement, penetrates into the material and, in so doing, simultaneously yields its energy to the material throughout the entire depth of penetration. The intensity of the beam is controlled to ensure that a certain minimum density of energy reaches the material at the place of impingement. As soon as this density of energy is attained, the beam penetrates into the material to a depth which depends on the material and on the beam intensity forming a narrow, highly heated channel and simultaneously melting the material. While the beam thus penetrates, the material laterally adjacent the beam is melted simultaneously over the entire depth of the penetration of the beam, the molten metal flowing together and fusing into a proper weld.

Advantageously, a beam intensity is employed which will be of a magnitude that the beam will completely penetrate the material, thus ensuring that the work pieces to be welded are welded together over the entire depth of the seam.

A sectional view of the weld seam produced herewith allows a cross sectional profile of the melted zone which is very narrow and only slightly tapered.

Further reference will be made to such welding system hereinafter in connection with FIG. 17.

Additionally, valve body 2 includes an externally threaded integral bonnet and extension 12 having a vertically disposed opening or valve chamber 14 therethrough communicating with the through-flow passage.

A valve member envisions a valve disc member 16 of generally circular cross section and a disc nut or valve disc securing member 18 fitted thereto, which nut, according to prior art practice would have been threadedly engaged therewith, and which by the letter and spirit of this invention, is preferentially secured thereto as by the electrical beam welding technique above described.

Preferentially, said disc is formed from a hard metallic alloy of the type normally not considered machinable but lending itself to being shaped to its ultimate configuration as by an investment cast system. Such alloys as are herein comprehended are not normally used in component fabrication, they offering limited machinability, and being notoriously expensive. Nonetheless, the dimensioning of the component in the valve designs herein envisioned lends itself admirably to the exploitation of such materials.

Disc 16, in its configuration, will include a circular, peripherally located, seating surface 20, complemental to the seating surface of the body seat for mating therewith in valve-closed position, the hard disc material providing, cooperatively with said body seat, the requisite gall and wear resistant surfaces at their point of juncture.

Additionally, disc 16 may be configured so as to allow a horizontally disposed, peripherally located, circular recess 22, upwardly of seating surface 20, to permit an obvious weight reduction and economy of material, and to offer a flexibility in seating flange so as to enhance a pressure-tight mating.

Upwardly thereof, said disc is configured to include a radially outwardly extending circular flange 24 for disc-centering and guiding functions and allowing a gall and wear resistant surface confrontable against the adjacent valve body wall as the result of developed side thrusts expectable by virtue of the magnitude of the generated forces in the high pressure operations conceived herefor.

The upper planar surface of disc guide 24 may be configured to provide radially extending or otherwise arranged slots 27 or equivalent, so shaped as to accommodate a suitable tool for mechanically effectuating disc rotation for lapping purposes.

The upwardly facing, centrally located surface of disc 16 may be arcuately configured, although other designs are of course within the limits of practicality, to allow a valve stem seating surface 26 with similar gall and wear resistant characteristics.

As envisioned, disc 16 and disc nut 18 are preferentially loosely mounted upon valve stem 28, conventional in the case of revolving stems, so as to be free to rotate relative thereto, said nut serving as a retainer for retaining the valve disc relative to the valve stem by means of a conventional split ring 30, formed of a pair of half rings or otherwise loosely seated in a complemental valve stem recess 32 and embracing the disc nut inner wall in manner to assure a freedom of angularization of valve disc relatively to valve stem and its longitudinal reciprocation therewith.

It is to be emphasized that by the teaching of a valve disc in the form of a single unitary casting, I achieve the desideratum of providing gall and wear resistant surfaces at the insert or seat ring contacting, valve body contacting, and valve stem contacting areas, in combination with means facilitating the rotating of said disc during lapping.

The valve member is movable between fully closed position at the inner end of the valve chamber 14 where it sealingly engages the complementary seating surface of the valve seat for closing the through flow passage and fully opened back seated position at the outer end of the valve chamber 14 wherein the nose of the disc nut will be suitably recessed in and in sealing engagement with a lower face or back seat position of a bonnet assembly or replaceable bonnet packing cartridge 38.

Said bonnet has been delineated a replaceable bonnet packing cartridge for the reasons that it is demountable and replaceable, is a bonnet in the sense that while separate from the yoke it nonetheless effectuates a valve body closing in conventional valve bonnet manner, and is a packing cartridge in the sense that it is a self-contained magazine to be mounted or demounted as desired thereby obviating the aggravating prior art necessity of "chewing out" the packing material by means of a packing hook or like tool.

The bonnet assembly is constituted by a cylindrical body member, nestably receivable within opening 14 and a unitary, radially disposed, annular flange 40 downwardly of its upper planar surface for vertically aligned disposition over the upper planar surface of the bonnet end extension.

The lower portion of the outer side wall of bonnet 38 is configured to allow an annular, outwardly facing, angularly disposed, conical, preferably generated, seal surface 44, and the inner wall of bonnet end extension 12 is configured to allow a strategically located annular, inwardly facing, angularly disposed, conical, preferably generated, seal surface 46, so complemental to seal surface 44 as to provide a tapering annular interval or groove between the confronting conical seal surfaces.

Seal surfaces 44 and 46 are characterized by different angles wherewith the provided circular interval therebetween tapers so as to be wedged shape in configuration, in which interval, an annular float ring seal 52, formed of a suitable elastic material and having a similarly tapering cross section, is seated.

In practice, the tightening of the clamp yoke, subsequently to be described, relative to the valve body serves to force the bonnet or bonnet cartridge into the body and to restrain same against displacement so as to assure a positive initial tight sealing of the float ring seal into the wedge-shape interval. Same will normally be hand tight, there being an absence of the full deformation load as required with conventional gasketed sealing of the body-to-bonnet joint. Once set up, the sealing surfaces are maintained stationary with respect to each other, and internal pressures generated within the casing will serve to force the float ring seal into enhanced sealing position, said seal, by virtue of its own elasticity, exhibiting a tendency to move toward the apex of the wedge of the interval.

The float ring seal exerts a sealing pressure against each of the sealing surfaces proportional to the original make-up loading and the generated pressures internally of the casing.

Additionally, the actuation of the said seal under pressure creates an automatic compensation for thermal expansion and contraction under commonly encountered fluctuating temperature conditions.

Bonnet 38 is provided with a centrally located, annular, back seat portion 81, circumjacent an opening 80 through the bottom wall of the cartridge, said back seat being formed with a tapering surface cooperant with a complementally tapering nose 82 at the upper end of disc nut 18 allowing sealing engagement therebetween when the valve is in the fully opened position.

A clamp yoke, generally indicated by 60, has a suitably divided or split lower annular ring 62, said split being indicated at 63 shown at one side of the ring in FIG. 2, in manner to allow ring spreading of a degree to permit passing thereof over the upper end portion of bonnet end extension 12, said ring having a lowermost portion internally threaded at 66 for threaded securement, as by an acme or square or buttress thread, with said bonnet end extension.

Ring 62 is further provided with a radially disposed, inwardly facing annular bonnet cartridge retaining flange 68 formed unitarily therewith in vertically spaced relation above said threads 66 and adapted to seat upon the upper planar surface of bonnet flange 40, therewith to achieve the desideratum of providing a preload to float ring seal 52 and a locked relationship of the bonnet between the valve body and clamp yoke.

Projecting laterally through the opposed split sections of ring 62 are aligned openings for the reception therethrough of a clamp bolt 70, same being threadedly engaged with one of said split sections and having a free fit in the opening of the other of said split sections, wherewith to effect, upon rotation of the clamp bolt in one direction, a drawing together of the split sections and a resultant tight interengagement of clamp yoke and valve body. When the clamp bolt is rotated reversely, a snap ring 72, seated in a suitable annular recess centrally of the clamp bolt shank and disposed between the split sections, facilitates disassembly by encouraging a spreading of the split sections with a resultant increase in clearance between the valve body and clamp yoke threads. Appreciably, the clamp yoke may be otherwise split or divided so as to achieve corresponding results.

For example, the clamping arrangement could be achieved by a bayonet type locking device or equivalent made fast by a bolt connection arranged tangential to and interconnecting the body and yoke in manner such that the tightening of the bolt would advance the yoke downwardly relative to the body.

The clamp yoke is additionally comprised of a pair of integral, vertically extending, yoke arms 74, 74 of identical configuration extending vertically upwardly from ring 62 on diametrically opposite sides of stem 28 and terminating in an integral, upper, annular ring 76.

Valve stem 28 is extendable through a counterbore 83 in the bonnet and also through opening 80 in the bonnet lower wall, said opening 80 being of a diameter to allow free rotation and longitudinal movement of the stem relative thereto, and said counterbore 83 being of a diameter to allow free rotation and longitudinal movement of the stem relative thereto, and said counterbore 83 being of a diameter to allow reception therein of a packing comprised of a superposed plurality of removable packing rings 84 disposable in surrounding relation to the stem to provide a suitable bonnet-valve stem seal as the packing is compressed longitudinally by a gland means encompassing the valve stem and receivable within said counterbore, as will appear.

It will be observable that, in the combined bonnet 38 and the packing 84 therefor, I provide a unitary assemblage in the form of a cartridge or magazine adapted for ready insertion into and removal from a valve body, same being easily renewable in situ without any special tool need, and being of relatively economical manufacture, wherefore a spent cartridge may be readily replaced by a new cartridge complete with complement of new packing rings, the spent cartridge being re-equipped at leisure or being discarded, according to choice.

As known, the insertion of additional packing rings into a cartridge already in situ and/or the complete replacement thereof are common maintenance problems brought about by repetitious stem reciprocation, with the attendant created conditions of baking and shrinkage enduced by the high temperature of the stem as it is withdrawn upwardly from the casing.

A gland means, generally indicated by 90, and interrelated to clamp yoke 60, serves adequately to load packing 84 so as to effectuate the sealing, and is so designed as to allow its ready removal. It may be constituted by a horizontally disposed gland flange 92 and a vertically-extending gland bushing 94 unitary therewith or separate therefrom and depending downwardly and centrally thereof, said flange and bushing being disposed circumjacent stem 28 by means of a vertically disposed central opening 96 therethrough, with the opening, throughout the greater uppermost portion of its length, being of a diameter in excess of the stem diameter thereby to preclude the establishment of binding forces against the stem. It may be further constituted by diametrically opposite gland bolts 100, each pivotally mounted at a lower end upon a horizontally extending gland bolt pin 102 extendable between spaced upstanding bosses 104 integral with ring 62 and having an upper end extendable by a free fit through a suitable opening in the respective ear of the gland flange, with a gland bolt nut 106 being threadedly engaged therewith for securing the gland bolt to the gland flange, all whereby the gland bolt nuts may be "walked down" uniformly upon their respective gland bolts to effectuate downward movement of the gland bushing upon the upper surface of the packing and within the bonnet so as to compress the packing and thereby form a casing-stem seal.

The outer and upper end of stem 28 has a handwheel 110, held in place as by a nut 112, and by the rotation of which the stem may be rotated.

Ring 76 is provided with a central, vertically extending, threaded opening therethrough for receiving in threaded engagement therewith a yoke bushing 120, said yoke bushing having a central, vertically extending, threaded opening therethrough permitting its threaded engagement with stem 28 in manner to allow stem reciprocation relative thereto and to absorb the generated vertical thrusts of said stem through the threads. A radially disposed, outwardly extending flange 122 is provided at one extremity of the yoke bushing and allows a shoulder for seating, in the assemblage illustrated, upon the upper planar surface of ring 76. Additionally, the yoke bushing may be locked in place relative to the ring by suitable means, such as one or more tack welds 123 or brazing, to prevent accidental disengagement of the component parts.

Figures 6, 7, 14:
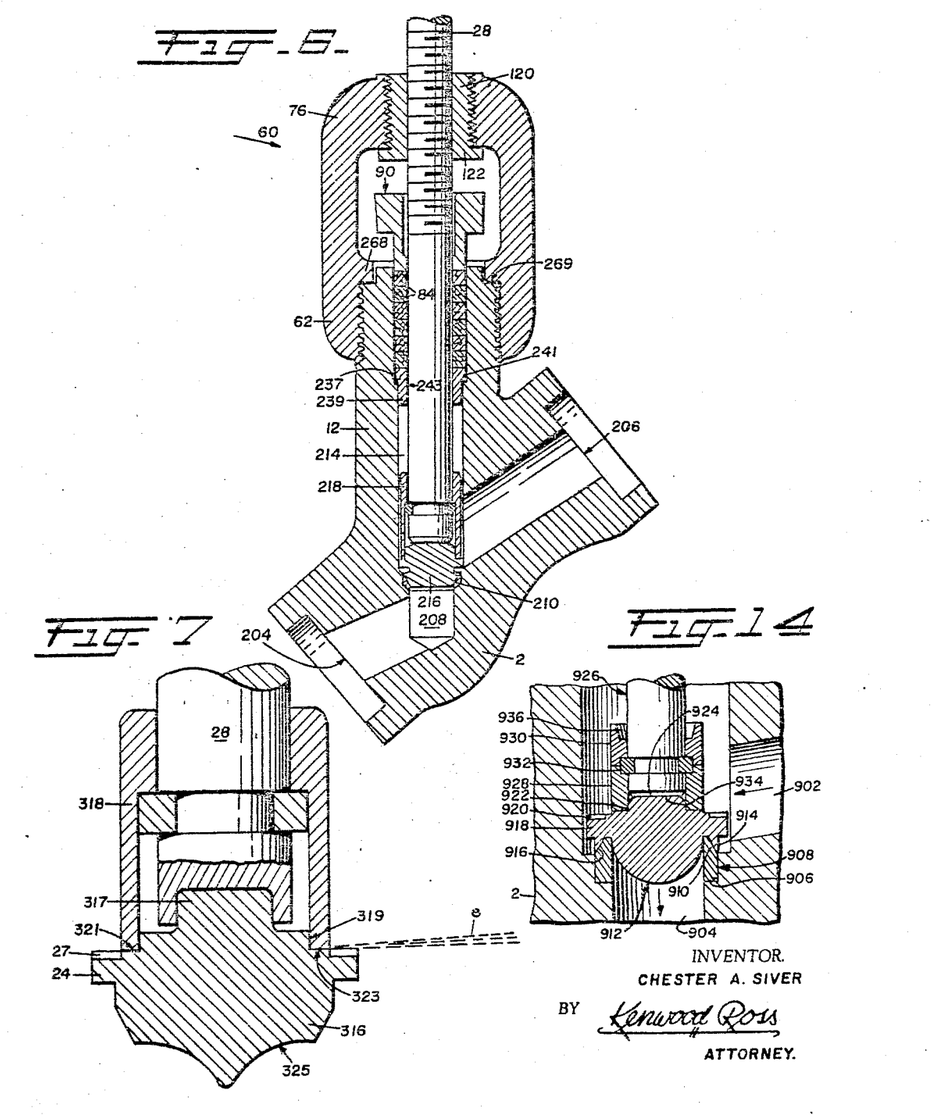
FIG. 6 illustrates, in vertical central sectional assembly view, a modified form of valve construction.
FIG. 7 illustrates, fragmentarily, a valve stem and modified forms of disc and disc nut and related components, said modified components being shown in section for clarity.
FIG. 14 illustrates in fragmentary section an inverted disc sealing arrangement.

In FIG. 6, I have shown, in fragmentary view, an assembled valve inclusive of a valve body or casing 2, machined from a valve body forging identical to that used in the valve of FIG. 1, and differing therefrom in that the instant valve is of a loose back seat design instead of a fixed back seat type. Although such loose back seat design does not permit repacking under pressure, as does the previously described design, it does allow the absence of a bonnet to contribute to a greater simplicity. Such is especially suited to those small size or high pressure rating valves wherein the outside diameter of a preferred size packing chamber within the valve casing approximates or is greater than the inside body opening.

Said valve body 2 comprehends end ports 204 and 206, an interconnecting through flow passage 208, a hard-surfaced valve body seat 210, a unitary bonnet end extension 12 having an opening 214 of appropriate diameter therethrough in which a valve stem 28 is reciprocable, and a valve member coacting with the lower valve stem extremity and comprising a circular disc 216 and a disc nut 218 secured thereto in manner similar to that delineated in reference to the FIG. 1 valve.

The inner wall of bonnet end extension 12 is otherwise configured, however, to provide a circular, horizontally disposed shoulder 237, spaced downwardly of its upper extremity wherewith the diameter of opening 214 upwardly of said shoulder and defining the packing chamber is of greater diameter than the diameter of the opening downwardly thereof.

Within opening 214, a loose back seat 239 is receivable, same having a radially disposed, outwardly-extending circular flange 241 at its upper extremity to allow seating upon shoulder 237, the outside diameter of the loose back seat at its upper extremity being such as to allow its snug accommodation within opening 214 upwardly of said shoulder, and the outside diameter of the back seat downwardly of the flange being such as to allow its accommodation within the opening of the bonnet end extension downwardly of said shoulder.

Said loose back seat is further provided with a vertically-extending opening 243 centrally therethrough for the close-fitting reception of stem 28.

Upwardly of the loose back seat, a plurality of removable packing rings 84 is provided in surrounding relation to the stem to provide a suitable casing-stem seal, with the full generated pressures within the casing being exerted upon the loose back seat and the packing vertically thereabove.

The clamp yoke being basically as illustrated in the case of the valve of FIG. 1, a recitation of its individual components is not indicated, save for the respect that the radially-disposed, inwardly facing circular flange 268 seats upon a complemental circular shoulder 269 provided by a recess in the outer peripheral wall at the upper extremity of the bonnet end extension as clamp yoke ring 62 is threadedly interengaged with valve body 2.

Additionally, in this version, yoke bushing 120 is shown as inverted, wherefore the radially disposed, outwardly-extending annular flange 122 at one extremity thereof is brought to bear upon the lower planar surface of ring 76. As in the form of FIG. 1, the internal thread of the yoke bushing allows reciprocation of stem 28, but otherwise, such yoke bushing inversion allows the locating of flange 122 downwardly of ring 76 wherewith the full load of the generated vertical thrusts is upon the flange rather than upon the threads.

Significantly, this freedom of inversion is such that the upright or inverted positions of the yoke bushing may be employed interchangeably in any of the valves hereof.

It is to be additionally explained that, if desired, the valve of this modification might be readily converted to a "throw-away" type by welding the loose back seat to the bonnet end extension inner wall. Further, the loose back seat conceivably might be threadedly engaged with and suitably sealed relative to the bonnet end extension inner wall.

The salient advantage of the clamp yoke in combination with the construction of this modification lies in the fact that all components are readily separable affording easy access to the packing and disc and seal ring members, without the requirement of releasing any seal welds or tack welds as in prior art constructions.

In FIG. 7, I have illustrated a modified form of valve member incorporating a disc member stem aligning feature wherein the annular disc 316 is provided with an integral uppermost, vertically extending centrally located cylindrical portion 317 which is receivable in a complementally configured recess in the lower planar wall of stem 28, same serving to center disc member 316 relative to the stem and to preclude its cocking, and being adapted to take the full end thrust of the generated forces within the valve body. Alternately, such disc-stem aligning means could be constituted reversely by a cuplike arrangement at the disc for receiving the stem end, same being receivable in complementally configured recess in the upper planar surface of disc member 316.

Recesses or slots 27 in the annular flange or disc guide 24 similar to that shown in the case of the disc of FIG. 1, allow interengagement of the disc and a suitable tool for effectuating disc rotation for the lapping of sealing surfaces, as aforesaid.

A disc nut 318, enclosed around an annular shoulder 319 concentric with portion 317 of the disc member, performs the usual disc nut function and, as earlier stated, may be secured to the disc member as by electron beam welding. As shown, a charge carrier beam, indicated by $e$, is focused toward the seam or in the plane of the area to be penetrated. The first work piece, namely disc member 316 having an annular side, or surface 321 in contact with an edge 323 of the second work piece, namely disc nut 318, the beam is directed at the confronting side and edge with sufficient intensity to penetrate the two work pieces in the direction of and along the plane defined by the confronting portions, thereby producing a weld between the two work pieces.

The disc member may be configured at its lowermost surface 325 so as to allow a frusto-conical or spherical seating portion for accommodation within a coaxial frusto-conical recess (not shown) in the seat of the related valve body, it being understood that the present invention is not to be considered as limited thereto in its broader aspects, conoidal and other forms being equally suitable.

As earlier alluded to, this form of the invention likewise comprehends the exploitation of an investment casting system as a means allowing the fabrication of preformed and preshaped members such as a valve disc member and valve nut from a refractory metal, normally not considered machinable, so as to provide non-galling and wear resistant surfaces at a plurality of sites.

Figure 8:
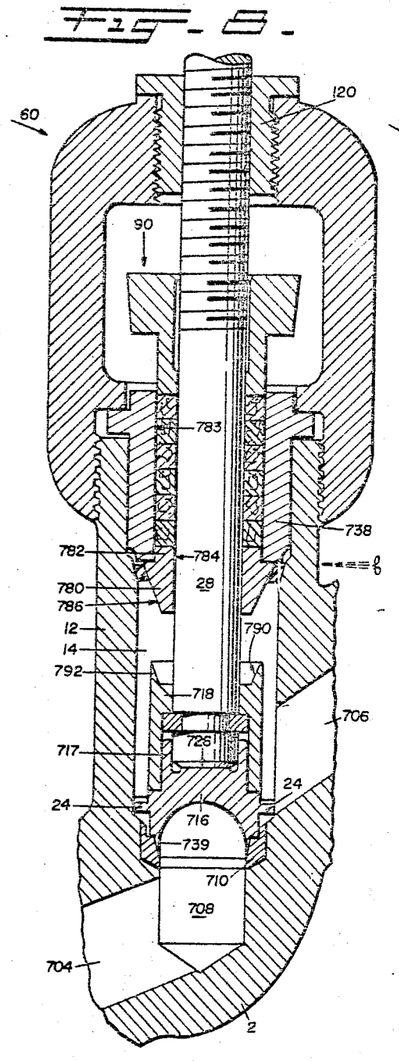
FIGS. 8 and 9 illustrate, fragmentarily, in vertical central sectional assembly valve-closed and valve-opened views respectively, another form of valve construction further modified as to its disc and disc nut and related parts.
Figure 9:
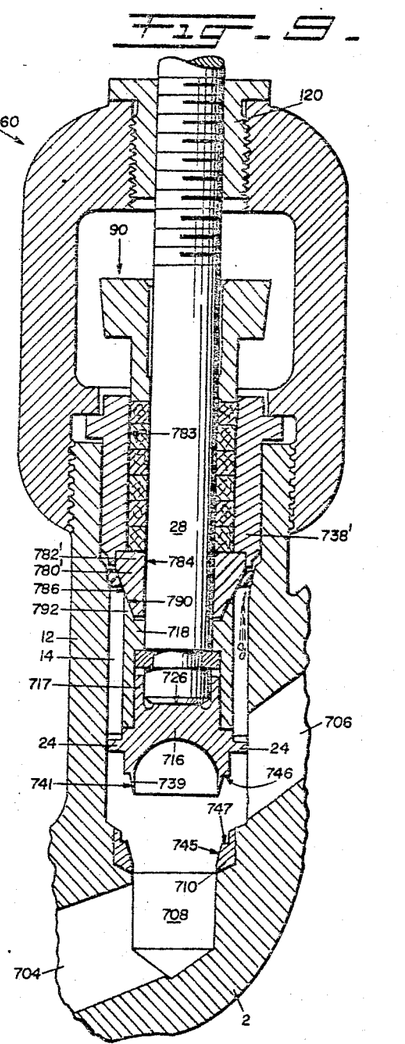

On sheet three of the drawings, I have shown in FIGS. 8 and 9, a modified sealing system adapted to provide the aforedescribed flange means or disc guide for the guiding and centering of the valve disc member and the simultaneous limiting of any buildup of pressure thereabove and further to provide an improved arrangement for closing and sealing the opening between the disc and its complemental valve seat ring.

Therein, an assembled valve is shown, inclusive of a valve body 2 having end ports 704 and 706, an interconnecting through flow passage 708, a horizontally disposed, hard-surfaced, valve seat ring 710, a bonnet end extension 1 having a valve chamber 14 therethrough in which valve stem 28 reciprocates, and a valve member engaged with the lower extremity of the stem and comprising a circular disc member 716 and disc nut or retaining member 718.

The disc member 716, as before stated, is formed from a hard metallic alloy, shaped as by an investment casting system, to allow a peripheral seating surface, subsequently to be referred to, a radially outwardly extending disc guide 24, a valve stem seating surface 726, and a valve stem guide 717.

The disc sealing means comprises an outermost or lowermost circumferential sealing lip 739, unitary with and depending downwardly from the disc main body portion and exhibiting some inherent degree of flexibility under the conditions to be defined and having an outermost, inwardly tapering, frustoconical-generated (generally conical) sealing surface 741 so as to allow an improved combined seal and closure construction particularly adapted to be utilized for effecting a fluidtight seal capable of withstanding the high pressures and/or temperatures contemplated.

An annular joint is formed by the sealing lip mating with a circular frusto-conical sealing surface 745 provided on the internal wall of sealing ring 710, which preferably will be accurately preformed from a hard, wear resistant material by a means, such as investment casting, and welded in fluidtight relationship to the body by electron beam welding, but which seat may conceivably be secured as by threaded interengagement or by brazing or by being machined integrally in the body.

The angle of inclination or taper of the circumferential conical sealing surface 745 on the internal wall of sealing ring 710 is normally slightly larger, with respect to the axis of reciprocation of the valve stem than the corresponding angle of inclination or taper of the circumferential conical sealing surface 741 on the sealing lip, all whereby there may be established a frusto-conical, fluidtight seal between the mating members.

The stem is adjustably maintained in sealing engagement with the valve body through means of the clamp yoke construction wherefore downward movement of the stem will effectuate concomitant downward movement of the disc member so that the sealing lip is deflected inwardly by its interengagement with sealing surface 745, thereby to effect a frusto-conical seal therewith. The design of the sealing element is such that its circumferential conical sealing surface will initially contact surface 745 at its lowermost extremity because of the aforementioned difference in angles of the sealing surfaces 741 and 745. Continued axial movement downwardly of the disc member and stem will cause the sealing lip to be compressed inwardly so as to permit sealing surface 741 to change the angle so as to contact sealing surface 745 and provide a fluidtight seal.

Such radial inward compression of the sealing lip creates a strain within the elastic limit of this member and hence, energy is stored in the sealing member whereby a constant and continuous force is exerted on the sealing surfaces to assure the fluidtight contact. Fluid pressure in passage 708 against the inner periphery of the sealing lip 739 tends to enhance the fluidtight seal rather than to detract from the effectiveness of the seal as in prior art seat arrangements.

Upwardly of sealing lip 739, an outwardly extending circumferential shoulder 746 is provided on said disc member for limiting sealing lip deformation in that as same is deflected radially by its interengagement with sealing surface 745, any over-deflection of the sealing lip beyond its own elastic limit will be precluded by the interengagement of said shoulder with a strategically located, complemental, circumferential shoulder 747 upwardly of sealing surface 745 on the valve seat ring.

The interrelationship will be so dimensioned as to allow tight drawing up of the disc, through operation of the valve stem, said confronting shoulders 746 and 747 precluding vertical movement beyond a point where the elastic limit of the sealing lip is exceeded, as aforesaid. Concomitantly, shoulders 746 and 747 may also serve to provide a secondary seating means.

The flexible sealing lip, operationally, is tightly urged and maintained in sealing engagement against sealing surface 745 by virtue of the internal energy created therewithin by its own deflection and the seal is enhanced by the fluid pressure within the vessel tending to force the sealing lip into increasingly strenuous contact with the sealing surface when and as the generated pressures increase.

As an additional feature in this exemplification, the lower extremity of the outer wall of bonnet assembly 738 may be provided with a back seat portion having an elongated, circumferential, inwardly tapering, frusto-conical (generally conical) sealing surface unitary with said bonnet assembly, although preferentially, I have provided a separate annular, hardened wear resistant back set-stem guide or back seat portion 780 configured to provide an annular upstanding extension 782 centrally thereof and adapted to be receivable by a snug fit in a packing ring counterbore 783 extending through the bonnet, with the said back seat-stem guide being welded to the bonnet, as by the aforementioned electron beam welding teechnique, said weldment extending radially as indicated by the charge carrier beam indicated by $f$ in FIG. 8.

Alternatively, the back seat-stem guide and bonnet arrangement could be otherwise configured, as shown in FIG. 9, wherein the upper cylindrical end portion 782' of the back seat-stem guide 780' is accommodated within a complemental annular recess extending inwardly from the lower end face of the bonnet 738' whereby the welding therebetween may be effected by a coaxially disposed charge carrier beam as indicated by $g$.

In either instance, the configuration of the back seat will be such as to allow an outer circumferential, inwardly tapering, frusto-conical sealing surface 786, and whether said sealing surface is constituted as a unitary part of the bonnet, as aforementioned, or the sealing surface is constituted as a part of a separate, hardened, wear-resistant back seat portion, as shown in two forms, one in FIG. 8 and one in FIG. 9, said sealing surface will complement an annular, outwardly tapering, frusto-conical sealing surface 790 of a sealing lip 792 circumscribing a central recess at the upper extremity of disc nut 718 and unitarily formed with said disc nut so as to be substantially complementary to the bonnet cartridge or back seat sealing surface, as the case may be, when the valve is retracted to fully opened position, as shown in FIG. 9, thereby to form therewith a pressure actuated back seat.

When circumferential surface 790 engages with circumferential surface 786, means is provided for effecting a deflection of the sealing lip so that energy will be stored therein to result in the application of a constant interval pressure or force on the sealing lip to continuously urge it into complete sealing contact with its seal.

Whereas the valve disc member arrangement previously shown and described comprehends forces generated by compressive stress, the back seat arrangement here being delineated comprehends forces generated by tensile stress. Such alternate arrangement is desirable so as to allow the fluid pressure to act upon the outer periphery of the lip in such manner as to increase the sealing force.

Conceivably, a seat design employing pressure within chamber 14 and over the disc, with an inward flow through port 706, would employ a valve disc configured similarly to the back seat shown, all so as to exploit the pressure sealing benefit.

This back seat-stem guide feature, aside from being an easier-to-fabricate member, offers the significant features of a hardened, wear resistant back seat inclusive of a hardened, wear resistant stem guide surface 784 and a hardened, wear resistant float ring seal surface 786 within a unitary, preshaped, accurately dimensioned component, and its projecting characteristic allows stem guidance through an additional portion of its overall length and at a highly critical stress area as contrasted with prior art arrangements. Furthermore, its design conceivably allows the elimination of the body guide in cases of moderate pressure applications.

Figure 10:
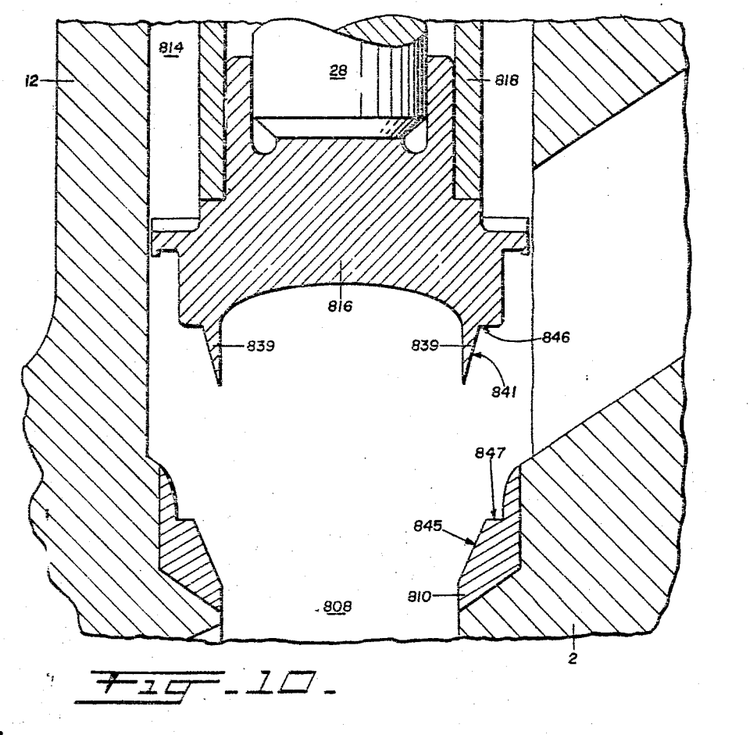
FIGS. 10 and 11 illustrate, fragmentarily, in vertical central sectional assembly views, another modified form of a valve disc sealing arrangement in the opened and partly closed positions respectively.
Figure 11:
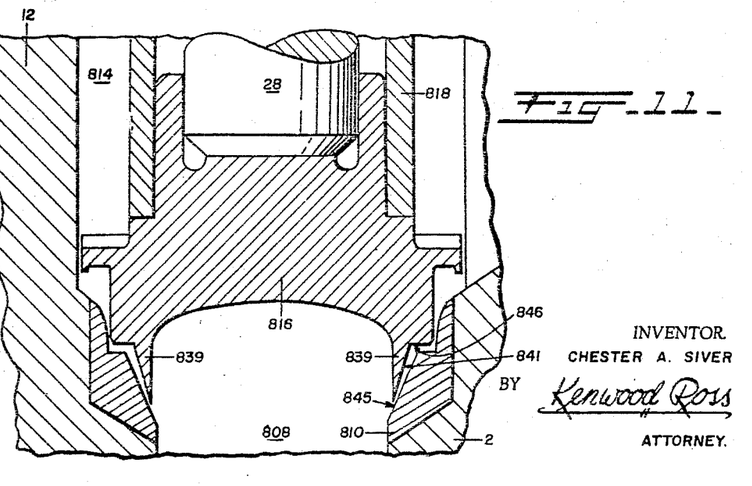
Figure 12:
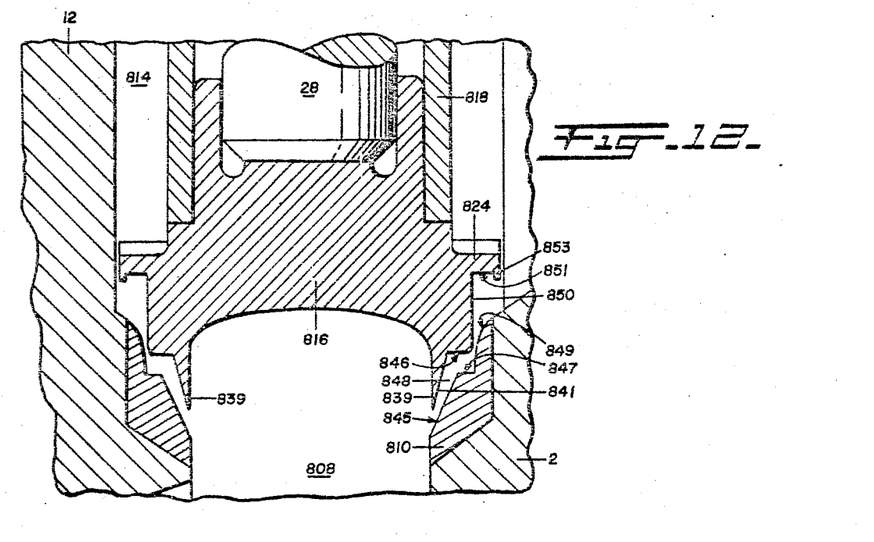
FIG. 12 illustrates, fragmentarily, in vertical central sectional assembly view, the modified form of FIGS. 10 and 11 to illustrate the throttling means.

In the modification of FIGS. 10–12, I have shown another modified form of sealing system especially adapted to accommodate the inherent throttling effects within the valve body during valve opening and closing, it being understood that, for optimum results a sealing arrangement, desirably, should avoid the potential threat of erosion caused by said throttling. As herein envisioned, such is achieved by taking the throttling at surfaces other than the sealing surfaces, the said sealing surfaces thus being gainfully employed for purposes of effectuating final sealing only.

I have shown, in fragmentary view, an assembled valve inclusive of a valve body 2 having an interconnecting through flow passage 808, a horizontally disposed, hard-surfaced valve body seat 810, a bonnet end extension 12 having opening 814 therethrough on which a valve stem 28 reciprocates, and a valve member engaged with the lower extremity of the valve stem and comprising a circular disc member 816 and a disc nut 818 secured thereto.

As previously alluded to, the disc member 816 is formed of a hard wear-resistant material so as to allow intricately configured and accurately dimensioned surfaces readily and economically by way of an investment casting system.

The seating surface of disc member 816 comprises a lowermost, annular frusto-conical, inwardly tapering, sealing lip 839 integral with and depending from the main body portion thereof so as to allow a circumferential, generated, sealing surface 841. Formed about the outer circumferential surface of said sealing lip is a circular frusto-conical sealing surface 845 provided in the internal wall of valve body seat 810.

Upwardly of the sealing lip, the disc member is provided with a circumferential, radially extending, limiting shoulder 846 designed for mating with a complemental circumferential, radially extending, limiting shoulder 847 circumjacent the valve seat. Same are cooperable to function as a stop or limiting means for precluding vertical movement downwardly of the disc member when in the closed position beyond a point where the elastic limit of sealing lip 839 is exceeded, wherefore, over-deflection is prevented.

In FIG. 11, I have illustrated the positioning of the sealing lip as it is about to contact the surface 845.

With particular reference to FIG. 12, it will be observed that upwardly of limiting shoulders 846 and 847, a throat 848 is defined between a gradually outwardly diverging circular body wall portion 849 of seat ring 810 and a relatively vertically disposed cylindrical disc wall portion 850, forming an ever-enlarging annular throat, in which throat the major throttling of the stream is taken as the stem and related parts are moving downwardly and the sealing lip is moving toward its closed seating relationship with the insert ring to provide a final positive seal thereat, or reversely as the valve is being opened.

In prior art valves, the member upon which the jet stream impinges tends to erode rapidly, especially where steam is the fluid. Herein, the hard, wear resistant lower planar surface 851 of disc member guide 824, as a unitary part of the disc, serves as a hard-surfaced, impingement target being advantageously adapted to withstand such impingement, with the result that the damaging erosive action is minimal.

As a further feature, and in order to confine the jet stream, the disc guide may be provided with a downwardly depending circumferential deflecting lip 853 at its outermost periphery, wherewith to guard against deflection from said surface 851 against the body wall.

While there may be some element of bounce from surface 851 to diverging body wall 849 and/or disc wall 850, such is much less adverse than the main stream impingement, since the energy of the jet stream following such bouncing is rapidly dissipated in the accompanying turbulence.

It is to be noted that such design additionally allows a means for absorbing the side thrust imposed upon the disc during the throttling condition in the form of the hard, wear-resistant surface of diverging wall 849 of the seat which functions to take the side thrust as the hard, wear resistant disc wall 850 is moved in a side-to-side motion, such sidewise movement being restricted by the restraining action of said wall 849, as contrasted with prior art constructions where the body guide is thrust against the soft body wall.

As the opening of the valve is initiated, the side thrust builds up very rapidly because of the large pressure differential between interconnected valve passages and then decreases as further opening movement is effectuated and the pressures are equalized. With as little as 10% of a normal opening, a tremendous side thrust is developed which, by the means hereof, is absorbed, whereby stem centering is facilitated.

Figure 13:
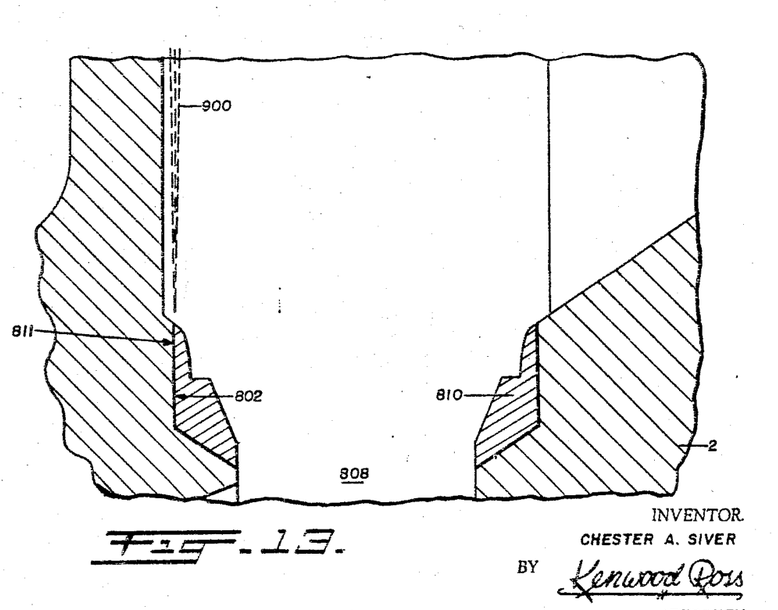
FIG. 13 illustrates, fragmentarily, in vertical central sectional assembly view, a valve body and associated valve seat illustrating the system of electron beam welding said seat to said body.

With reference now to FIG. 13, I have illustrated therein valve body 2 with the stem and related components removed therefrom and with a cast hard alloy inserted seat ring 810, accurately preformed to desired contour and dimensions, and seated in snug-fitting position relative to the casing and in accurate alignment with and at the bottom of chamber 808 preparatory to the electron beam welding.

As earlier indicated, it is a primary aim of the present invention to provide means for assembling an accurately preformed hard alloy ring upon a relatively large body member and/or an accurately preformed disc to a disc nut or a back seat-stem guide to a bonnet without distortion or deformation, and with accurate alignment of one part with the other being faithfully maintained.

By the fusion of a hard alloy valve seat, such as ring 810, in situ within casing 2, by way of the electron beam welding of the former to the latter, I overcome the inadequacies of current practices both as concern manufacturing costs and as concern the number of rejected units.

The concept of electron beam welding comprehends use of a commercially available facility in the form of an electron beam welder wherewith the work pieces are positioned in a high vacuum chamber and heated by a bombardment of high energy electrons generated by suitable cathodes and accelerated by high voltages and focused electrostatically or magnetically in the form of a beam, said electrons not penetrating the solid or liquid metal, but rather passing through a region of low density metal vapor formed by the intense heat produced in the exceptionally localized area where the beam impinges upon the workpiece, which vapor, ionized by the electrons, refocuses the electron beam and reduces electron scattering.

The unique capability of electron beam welding lends itself ideally to the instant desiderata of fusion welding the symmetrical ring insert to the valve body by way of a ring-to-body joint around the circumference of the butting surfaces, or of fusion welding a disc to a disc nut, or a back seat-stem guide to a bonnet, as the case may be, and offers many advantages especially suited to the instant situation where the shapes of the parts and their relative positioning presents obvious problems.

The beam path, denoted by numeral 900, is undisturbed or uninterrupted by the work geometry in this specific instance, and in fact, the configurations of the work pieces being joined lend themselves to being preshaped and then welded into place by the passage of the electrons so as to allow maximum visibility of the work and pin-point precision of the fusing process, the beam being directed along the general axis defined by the confronting surfaces 802 and 811 of body and insert respectively whereby, with a clearance between body and insert being accurately maintained at less than the width of fusion action caused by the electron beam, the fusion readily ensues to provide a fluidtight adhesion of insert to body without the cracking and distinction of the hard insert material so often attendant upon prior art welding methods.

Referring now to FIGURE 14, therein illustrated is an inverse valve sealing structure wherein the through flow passage of the valve body 2 has an inlet port 902 and an outlet port 904 as indicated by the arrows. A bore portion 906 in the valve body 2 adjacent the outlet port 904 provides an annular seat for the annular seat ring generally designated by the numeral 908 and which has a portion projecting above the bore 906 with a generally conical seating surface 910 extending circumferentially thereabout. The valve disc member generally designated by the numeral 912 has a circumferentially extending guide flange 918 with a depending annular lip 914 having a generally conical seating surface 916 extending about the inner periphery thereof and cooperating with the seating surface 910 of the seat ring 908 by having an angle of taper normally slightly less than that of the seat ring 908 to provide transverse deflection. The flange 918 also has tool engaging slots 920 for receiving a lapping tool.

The cylindrical boss 922 provides a thrust surface 924 at its outer end and seats the collar 928. The valve stem 926 extends into the collar 928 and has its inner end 934 bearing against the thrust surface 924. The back seat element 930 has a generally conical seating surface 936 extending about the inner surface of a bore therein. The back seat element 930 and the collar 928 are welded together by an electron beam weldment and the collar 928 in turn is welded to the valve disc member 912 by an electron beam weldment. The disc member 912 is thus loosely mounted on the valve stem 926 by a split ring 932 seated in complemental annular recesses in the valve stem 926 and the collar 928 and back seat element 930.

The electron beam welding technique offers salient advantages over more conventional techniques in that (1) it permits a given work to be accomplished with a low total energy input to the workpiece, resulting in an extremely narrow parallel-sided or tapered weld zone and a consequent virtual elimination of workpiece distortion, the fusion occurring first and predominantly at the narrow area defined by the contacting surfaces rather than in the body of each respective member being joined, (2) it permits accurate control of the intensity and position of the energy applied, (3) it makes possible a close control not only of the total heat but also of the heat concentration, (4) it makes possible the localization of the heated area, (5) it permits the joining of metals with dissimilar melting points, (6) it allows a purity of technique such as to eliminate contamination of the workpiece material, (7) it permits the forming of a dissimilar-alloy joint which retains excellent tensile and stress-rupture strengths, (8) it allows, by the minimum energy input, the welding of many alloys unweldable by other techniques and the maintenance of their mechanical properties therefollowing.

The fusion process envisions the formation of an infinitesimally small parallel sided or slightly tapered weld wherein the contacting surfaces are in effect bracketed by a beam of highest power density (i.e. power per unit of impingement area) which allows the accomplishment of the required work in the shortest time with the smallest possible heat input to the workpiece, wherewith the commonly encountered weld dilution is avoided by virtue of the fact that the technique effects only a relatively thin veneer of the contacting surfaces.

By such system, I obtain a uniform distribution of current flow pattern about the periphery of the insert ring, or the valve disc, or the back seat, as the case may be, such that a uniform fluidtight metallic bond is achieved at a region of fusion of ring to casing, or disc to disc nut or back seat to bonnet, all without misalignment of the joined parts and all at a minimum of cost from the standpoint of labor and materials and with a minimal rate of unacceptable assemblies in mass production operations.

The infinitesimally small operating area comprehended by the electron beam welding system advantageously exploited herein because of the aforementioned considerations of dimensioning, allows the fusion of intricate, accurately dimensioned surfaces of preshaped members with other snug fitting circumscribing components at the locality of the contacting surfaces thereof in manner such that the ensuing plastic deformation imposes a practical minimum of strain on the body masses of the components being joined resulting in an absence of cracking or fracture due to thermal expansion forces and without dilution of the hard surfacing material.

It will be appreciated that the instant application lends itself ideally to the control of the factors which must be controlled in order to attain acceptable welds, for instance, the localization of the fusion to the area of the contacting surfaces and the maintenance of accurate alignment between the preformed insert ring or valve disc and disc nut and the parts to which the respective members are fused.

From the foregoing, it is apparent that the welding method in accordance with the present invention is of wide applicability in the provision of hard wear resistant alloy inserted elements on a relatively softer steel body so obviously essential in the valve industry where fluidtight bonds between wear-resistant inserts and a surrounding body are critical factors. Herewith, I provide for the production of valve components which are simpler in their designs, cheaper in their costs of fabrication, less wasteful of materials in their assembly, and longer lasting in operative use.

It is believed that the gist of the invention will be clearly understood from the foregoing disclosure, as I have, in accordance with the provisions of the patent statutes described, the construction and principle of operation of my invention together with the apparatus which I believe to represent the best embodiments thereof, to the end that others can, by applying current knowledge, readily adapt same for various applications without omitting features which, from the standpoint of prior art, fairly constitute essential characteristics of its generic and/or specific aspects.

The claims are desired to include, within the scope thereof, all of said suitable variations, modifications and equivalents by which the results of the invention may be substantially obtained through the use of the same or equivalent devices or means. Accordingly, limitation hereof should only be made as determined by a proper interpretation of the prior art and the scope of the subjoined claims, in which it is my intention to claim as broadly as possible all novelty inherent herein.

I particularly point out and distinctly claim:

1. A valve assembly including a valve body having a valve chamber communicating with a through flow passage; a bonnet assembly covering the outer end of said valve chamber; an annular valve seat ring of a hard, wear-resistsant metallic alloy secured to the wall of said valve body defining said chamber, the inner periphery of said annular ring defining the aperture therethrough having a generally conical seating surface portion opening towards said bonnet assembly, said valve seat ring having a diverging annular body wall portion extending from said seating surface portion toward said bonnet assembly; a valve stem reciprocable in said valve chamber relative to said bonnet assembly and seat ring; a valve disc member integrally formed from a single element of a hard, wear-resistant metallic alloy and having a circular cross-section, said valve disc member having a projecting annular sealing lip portion with a circumferential generally conical seating surface portion at the end adjacent said flow passage dimensioned and configured to cooperate with the generally conical seating surface of said valve seat ring and provide a fluidtight seal in cooperation therewith, said valve disc seating surface portion having an angle of taper relative to the axis of reciprocation normally slightly less than the corresponding angle of taper of said valve seat ring surface portion, said sealing lip portion being transversely deflectable within the elastic limit of said alloy by movement against said valve seat ring into stressed fluidtight sealing engagement with said valve seat ring seating surface, said sealing lip portion being transversely deflectable against said valve seat ring during operation of the valve assembly by pressure of fluid from the inlet portion of the through flow passage impinging against the inner peripheral surface of said sealing lip portion to enhance the sealing engagement of said valve disc seating surface with said valve seat ring seating surface, said valve disc member having a circumferentially extending body guide flange portion spaced axially from said disc member seating surface portion towards said bonnet assembly and dimensioned to provide a sliding fit with the wall of said chamber to limit radial movement of said valve disc member relative thereto and passage of fluid thereby and a thrust surface portion at the other end thereof facing said body bonnet assembly and valve stem, the inner end of said valve stem bearing against said thrust surface portion, said disc member also having an axially disposed cylindrical disc wall portion extending circumferentially between said seating surface portion of said valve disc member and said guide flange portion, said disc wall portion being concentrically reciprocable within said annular body wall portion of said valve seat ring to provide an annular diverging throttling throat to effect the major throttling action for substantially preventing erosion of the seating surfaces of said valve seat ring and said valve disc member during opening and closing of the valve; and a valve disc securing member having an aperture through which said valve stem extends and holding said valve disc in assembly with said valve stem for reciprocation axially of said seat ring, said valve disc securing member being metallic and firmly bonded to said valve disc member.

2. The valve assembly of claim 1 wherein the surface of said disc body guide flange portion facing said bonnet assembly is provided with tool engaging means for effecting disc rotation during lapping and wherein said valve disc member has a centrally disposed boss at said other end thereof providing a thrust surface portion at the outer end thereof and said valve stem has a centrally disposed recess in the inner surface thereof, said boss and recess being cooperatively dimensioned and configured with said boss being seated about its periphery within said recess and the innermost surface of said recess being in bearing engagement with the outer surface of said boss, the peripheral surface of said boss providing a stem guide portion of hard, wear-resistant metallic alloy retaining said valve disc member in substantial axial alignment with said valve stem, said valve disc member having limited angularity and being rotatable with respect to said valve stem.

3. A valve assembly including a valve body having a valve chamber communicating with a through flow passage; a bonnet assembly covering the outer end of said valve chamber; an annular valve seat ring of a hard wear-resistant metallic alloy secured to the wall of said valve body defining said chamber in said through flow passage, said annular seat ring having a generally conical seating surface portion about its end adjacent said bonnet assembly; a valve stem reciprocatable in said valve chamber relative to said bonnet assembly and said seat ring; a valve disc member integrally formed from a single element of a hard wear-resistant metallic alloy and having a circular cross section, said valve disc member having an annular sealing lip portion adjacent the end facing said seat ring and projecting towards said seat ring with a generally conical seating surface portion extending about the periphery thereof and dimensioned and configured to cooperate with the seating surface of said seat ring and to provide a fluidtight seal in cooperation therewith, said valve disc member seating surface having an angle of taper relative to the axis of reciprocation normally slightly less than the corresponding angle of taper of said valve seat ring seating surface, said sealing lip portion being transversely deflectable within the elastic limit of said alloy by movement against said valve seat ring into stressed fluidtight sealing engagement with said valve seat ring seating surface, said sealing lip portion of said disc member being transversely deflectable against said valve seat ring during operation of the valve assembly by pressure of fluid from the inlet portion of the through flow passage impinging against the surface of said sealing lip portion opposite said seating surface portion thereof to enhance the sealing engagement of said valve disc member seating surface with said valve seat ring seating surface, said valve disc member having a thrust surface portion at the other end thereof facing said bonnet assembly and the valve stem, the inner end of said valve stem bearing against said thrust surface portion; and a valve disc securing member having an aperture through which said valve stem extends and holding said valve disc, in assembly with said valve stem for reciprocation axially of said seat ring, said valve disc securing member being metallic and firmly bonded to said valve disc member.

4. The valve assembly of claim 3 wherein said seat ring has an annular portion spaced radially from the inner wall of the valve body and projecting towards said bonnet assembly with said conical seating surface portion extending circumferentially thereabout and opening away from said bonnet assembly and wherein said valve disc member is dimensioned and configured for movement of said annular sealing lip portion over the radially outer surface of said seat ring annular portion, said generally conical seating surface portion of said disc member lip portion extending about the inner periphery thereof and being configured for movement into stressed fluidtight sealing engagement with said valve seat ring seating surface, said disc member sealing lip portion being transversely deflectable against said valve seat ring annular portion during operation of the valve assembly by pressure of fluid from the inlet portion of the through flow passage impinging against the outer peripheral surface of said sealing lip portion to enhance the sealing engagement.

5. The valve assembly of claim 3 wherein said seat ring conical surface portion extends about the inner periphery of said ring defining the aperture therethrough and opens towards said bonnet assembly and wherein said disc member is dimensioned and configured for movement of said annular sealing lip portion inwardly of said annular seat ring with the generally conical seating surface portion extending circumferentially thereabout and configured for movement into stressed fluidtight sealing engagement with said valve seat ring seating surface, said disc member sealing lip portion being transversely deflectable against said valve seat ring during operation of the valve assembly by pressure of fluid from the inlet portion of the through flow passage impinging against the inner peripheral surface of said disc member sealing lip portion to enhance the sealing engagement.

6. A valve assembly including a valve body having a valve chamber communicating with a through flow passage; a bonnet assembly covering the outer end of said valve chamber; an annular valve seat ring of a hard wear-resistant metallic alloy secured to the wall of said valve body defining said chamber, the inner periphery of said annular ring defining the aperture therethrough having a generally conical seating surface portion at the end adjacent said bonnet assembly; a valve stem reciprocable in said valve chamber relative to said bonnet assembly and seat ring; a valve disc member integrally formed from a single element of a hard, wear-resistant metallic alloy and having a circular cross section, said valve disc member having a generally conical seating surface portion at the end adjacent said flow passage dimensioned and configured to cooperate with the generally conical seating surfaces of said valve seat ring and provide a fluidtight seal in cooperation therewith, a circumferentially extending body guide flange portion spaced axially from said disc member seating surface portion towards said bonnet assembly and dimensioned to provide a sliding fit with the wall of said chamber to limit radial movement of said valve disc member relative thereto and passage of fluid thereby, and a thrust surface portion at the other end facing said body bonnet assembly and valve stem, the inner end of said valve stem bearing against said thrust surface portion, the surface of said body guide flange portion facing said bonnet assembly having tool engaging means therein for effecting disc rotation during lapping of the valve disc member and valve seat ring; and a valve disc securing member having an aperture through which said valve stem extends and holding said valve disc in assembly with said valve stem for reciprocation axially of said seat ring, said valve disc securing member being metallic and firmly secured to said valve disc member.

7. A valve assembly including a valve body having a valve chamber communicating with a through flow passage; a bonnet assembly covering the outer end of said valve chamber; an annular valve seat ring of a hard wear-resistant metallic alloy secured to the wall of said valve body defining said chamber, the inner periphery of said annular ring defining the aperture therethrough having a generally conical seating surface portion at the end adjacent said bonnet assembly; a valve stem reciprocable in said valve chamber relative to said bonnet assembly and seat ring; a valve disc member integrally formed from a single element of a hard, wear-resistant metallic alloy and having a circular cross section, said valve disc member having a generally conical seating surface portion at the end adjacent said flow passage dimensioned and configured to cooperate with the generally conical seating surfaces of said valve seat ring and provide a fluidtight seal in cooperation therewith, a circumferentially extending body guide flange portion spaced axially from said disc member seating surface portion towards said bonnet assembly and dimensioned to provide a sliding fit with the wall of said chamber to limit radial movement of said valve disc member relative thereto and passage of fluid thereby, and a centrally disposed boss at said other end thereof projecting towards said bonnet, the other surface of said boss providing a thrust surface portion, said valve stem having a centrally disposed recess in the inner surface thereof, said boss and recess being cooperatively dimensioned and configured with said boss being seated about its periphery within said recess and the innermost surface of said recess being in bearing engagement with the outer surface of said boss, the peripheral surface of said boss providing a stem guide portion of hard, wear-resistant metallic alloy retaining said valve disc member in substantial axial alignment with said valve stem, said valve disc member having limited angularity and being rotatable with respect to said valve stem; and a valve disc securing member having an aperture through which said valve stem extends and holding said valve disc in assembly with said valve stem for reciprocation axially of said seat ring, said valve disc securing member being metallic and firmly bonded to said valve disc.

9. A valve assembly including a valve body having a valve chamber communicating with a through flow passage; a bonnet assembly covering the outer end of said valve chamber; an annular valve seat ring of a hard wear-resistant metallic alloy secured to the wall of said valve body defining said chamber, the inner periphery of said annular ring defining the aperture therethrough having a generally conical seating surface portion at the end adjacent said bonnet assembly; a valve stem reciprocable in said valve chamber relative to said bonnet assembly and seat ring; a valve disc member integrally formed of a hard wear-resistant metallic alloy and having a circular cross section, said valve disc member having a generally conical seating surface portion at the end adjacent said flow passage dimensioned and configured to cooperate with the generally conical seating surface of said valve seat ring and provide a fluidtight seal in cooperation therewith, a circumferentially extending body guide flange portion spaced axially from said disc member seating surface portion towards said bonnet assembly and dimensioned to provide a sliding fit with the wall of said chamber to limit radial movement of said valve disc member relative thereto and passage of fluid thereby, and a thrust surface portion at the other end facing said bonnet assembly and valve stem, the inner end of said valve stem bearing against said thrust surface portion, said conical seating surface portion of said seat ring opening towards said bonnet assembly, said end of said valve disc member adjacent said flow passage having a projecting annular sealing lip portion with a valve disc seating surface portion extending circumferentially thereabout, said valve disc seating surface portion having an angle of taper relative to the axis of the reciprocation normally slightly less than the corresponding angle of taper of said valve seat ring seating surface, said sealing lip portion being transversely deflectable within the elastic limit of said alloy by movement against said valve seat ring into stressed fluidtight sealing engagement with said valve seat ring seating surface, said sealing lip portion being transversely deflectable against said valve seat ring during operation of the valve assembly by pressure of fluid from the inlet portion of the through flow passage impinging against the inner peripheral surface of said sealing lip portion to enhance the sealing engagement of said valve disc seating surface portion with said valve seat ring seating surface; and a valve disc securing member having an aperture through which said valve stem extends and holding said valve disc in assembly with said valve stem for reciprocation axially of said seat ring, said valve disc securing member being metallic and firmly bonded to said valve disc member.

9. A valve assembly including a valve body having a valve chamber communicating with a through flow passage; a bonnet assembly covering the outer end of said valve chamber; an annular valve seat ring of a hard, wear-resistant metallic alloy secured to the wall of said valve body defining said chamber, the inner periphery of said annular ring defining the aperture therethrough having a generally conical seating surface portion at the end adjacent said bonnet assembly; a valve stem reciprocable in said valve chamber relative to said bonnet assembly and seat ring; a valve disc member integrally formed of a hard wear-resistant metallic alloy and having a circular cross section, said valve disc member having a generally conical seating surface portion at the end adjacent said flow passage dimensioned and configured to cooperate with the generally conical seating surface portion of said valve seat ring and provide a fluidtight seal in cooperation therewith, a circumferentially extending body guide flange portion spaced axially from said disc member seating surface portion towards said bonnet assembly and dimensioned to provide a sliding fit with the wall of said chamber to limit radial movement of said valve disc member relative thereto and passage of fluid thereby, and a thrust surface portion at the other end facing said bonnet assembly and valve stem, the inner end of said valve stem bearing against said thrust surface portion, said valve disc member having a circumferential shoulder portion facing said valve seat ring between said seating surface portion and guide flange portion, said valve seat ring having a circumferential shoulder portion facing said valve disc member for cooperation with said shoulder portion on said valve disc member to limit movement of said valve disc towards said valve seat ring; and a valve seat ring; and a valve disc securing member having an aperture through which said valve stem extends and holding said valve disc in assembly with said valve stem for reciprocation axially of said seat ring, said valve disc securing member being metallic and firmly bonded to said valve disc member.

10. A valve assembly including a valve body having a valve chamber communicating with a through flow passage; a bonnet assembly covering the outer end of said valve chamber; an annular valve seat ring of a hard wear-resistant metallic alloy secured to the wall of said valve body defining said chamber, the inner periphery of said annular ring defining the aperture therethrough having a generally conical seating surface portion at the end adjacent said bonnet assembly; a valve stem reciprocable in said valve chamber relative to said bonnet assembly and seat ring; a valve disc member integrally formed of a hard wear-resistant metallic alloy and having a circular cross section, said valve disc member having a generally conical seating surface portion at the end adjacent said flow passage dimensioned and configured to cooperate with the generally conical seating surface of said valve seat ring and provide a fluidtight seal in cooperation therewith, a circumferentially extending body guide flange portion spaced axially from said disc member seating surface portion towards said bonnet assembly and dimensioned to provide a sliding fit with the wall of said chamber to limit radial movement of said valve disc member relative thereto and passage of fluid thereby, and a thrust surface portion at the other end facing said bonnet assembly and valve stem, the inner end of said valve stem bearing against said thrust surface portion, the inner periphery of said valve seat ring defining said aperture therethrough having a diverging annular body wall portion extending from the seating surface thereof towards said bonnet assembly, said valve disc member having an axially disposed cylindrical disc wall portion extending circumferentially between the seating surface portion and said guide flange portion, said disc wall portion being concentrically reciprocable within said annular body wall portion to provide an annular diverge throttling throat to effect the major throttling action for substantially preventing erosion of the seating surfaces of said valve seat ring and said valve disc member during opening and closing of the valve assembly; and a valve disc securing member having an aperture through which said valve stem extends and holding said valve disc in assembly with said valve stem for reciprocation axially of said seat ring, said valve disc securing member being metallic and firmly bonded to said valve disc member.

References Cited by the Examiner

UNITED STATES PATENTS

| | | | |
|---|---|---|---|
| 877,865 | 1/1908 | Ricksecker | 251—334 |
| 1,257,076 | 2/1918 | Gallagher | 137—243 |
| 1,667,203 | 4/1928 | Harris | 251—330 |
| 1,951,037 | 3/1934 | Patterson | 251—210 |
| 1,995,395 | 3/1935 | Mohr | 251—214 XR |
| 2,147,332 | 2/1939 | Cornelius | 251—86 |
| 2,160,657 | 5/1939 | Haynes | 137—243 |
| 2,192,339 | 3/1940 | Wilson | 251—334 |
| 2,455,299 | 11/1948 | Cooley | 29—156.7 |
| 2,471,948 | 5/1949 | Gibian et al. | 29—156.7 |
| 2,596,681 | 5/1952 | Hammon | 251—214 |
| 2,722,401 | 11/1955 | Till et al. | 251—214 |
| 2,732,855 | 1/1956 | Hobbs | 251—330 XR |
| 2,744,775 | 5/1956 | Bredtschneider | 251—214 |
| 2,787,439 | 4/1957 | Bredtschneider | 251—329 |
| 2,842,336 | 7/1958 | Johnson | 251—330 |
| 2,982,514 | 5/1961 | Bryant | 251—329 |
| 3,003,744 | 10/1961 | Fennema | 251—330 |
| 3,033,517 | 5/1962 | Rovang et al. | 251—214 |

FOREIGN PATENTS

| | | |
|---|---|---|
| 1,248,029 | 10/1960 | France. |
| 888,143 | 1/1962 | Great Britain. |
| 149,193 | 3/1940 | Sweden. |

OTHER REFERENCES

Hancock—Catalogue of Hancock Valves, Watertown, Mass., valve type No. 7530W relied on. Copy in Group 360. Published 1962.

Rockwell-Edward—"Univalve," catalogue of Edward Valves, Incorporated, East Chicago, Ind., page 16 relied on. Copy in Group 360. Published 1962.

ISADOR WEIL, *Primary Examiner.*